March 11, 1958  R. J. VERNIER  2,826,075
HIGH SPEED SAMPLER
Filed May 1, 1956

INVENTOR.
Robert J. Vernier
BY George Renehan
ATTORNEY

2,826,075
HIGH SPEED SAMPLER

Robert J. Vernier, Baltimore, Md., assignor to the United States of America as represented by the Secretary of the Army Application May 1, 1956, Serial No. 582,055

5 Claims. (Cl. 73—421)

(Granted under Title 35, U. S. Code (1952), sec. 266)

The invention described herein may be manufactured and used by or for the Government of the United States of America for governmental purposes without the payment to me of any royalty thereon.

This invention relates to atmospheric samplers and in particular to a suction filter device for obtaining samples of solids or liquids contained in the atmosphere.

It is a particular object of this invention to provide an atmospheric sampler for sampling aerosols of highly volatile agents.

It is also an object of the invention to provide a suction filter sampler in which several samples can be rapidly taken in a short period of time.

A further object of this invention is to provide a suction filter sampler in which the filter can be easily and rapidly replaced.

The old method of obtaining atmospheric samples involves the use of a sampling tube in which a filter holder is a threaded cap which screws onto the filter head. In operating this type of sampler one must unscrew the filter holder, load the filter, and then screw the cap over the filter head. Removing the filter requires unscrewing the filter holder and poking the filter out of the holder into the receiving container. This old system is satisfactory when time is not important. In sampling aerosols of highly volatile agents, however, it is necessary to get the contaminated filter into a sealed container with a minimum delay. Much of the sample will be lost by evaporation if the filter is not handled swiftly. With the high speed sampler, handling time is reduced to a minimum.

Figure 1:
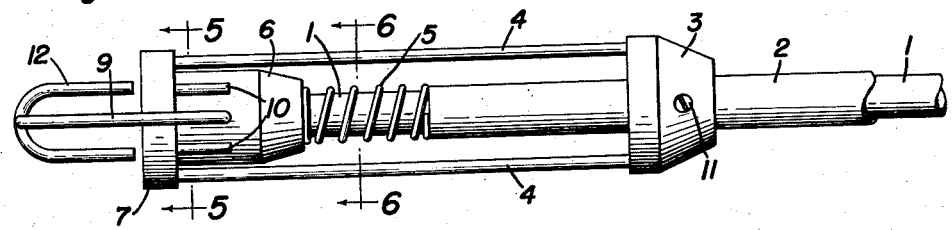
Fig. 1 is a plan view of the sampler.
Figure 2:
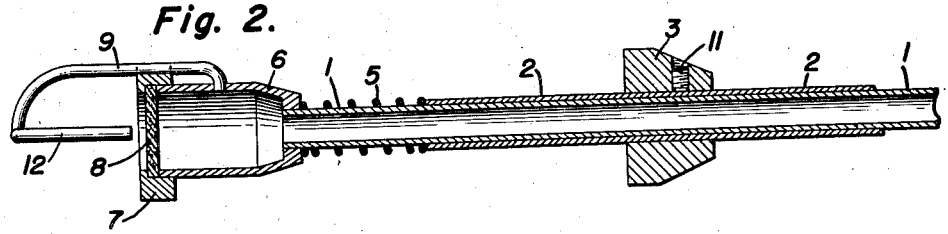
Fig. 2 is a sectional elevational view of the sampler with a filter disk in position for sampling.

Referring to the drawings a filter holder 7 is held fixed in relation to the outer telescope tube 2 by means of two tie rods 4 and anchor block 3. The filter holder comprises a ring with an annular shoulder 13 therein which forms a seat for a filter disk 8. An inner tube 1 is closely fitted inside of the outer tube 2 but slides in and out freely. A filter head 6 is mounted securely on the end of the inner telescope tube 1. A spring 5 mounted on the inner tube 1 bears on one end against the end of the outer tube 2 and on the other end against the end of the filter head 6. A preload of approximately 5 lbs. exists on the spring with the filter head 6 forced against the filter disk 8, the filter head and its associated parts thereby acting as a locking means to lock the filter disk 8 in the filter holder 7 as shown in Figure 2. The preload on the spring may be varied by varying the location of anchor block 3 on the outer tube 2 by means of set screw 11. The spring pressure locks the filter disk in the filter holder so that when a vacuum is applied to the inner tube 1 the atmosphere to be sampled will be drawn through the filter disk 8. The ejector 9 is a hard steel rod mounted rigidly on the filter holder and is slidable in a slot in filter holder 7 when the filter head 6 is moved away from the filter holder against the force of spring 5. Loading lugs 10 are rods securely mounted on the rear face of the filter holder 7. They hold the filter disk in position during the loading operation to be described below. These rods extend over the external surface at the filter head 6, thereby further acting as a guide for said filter head in locking the filter disk 8 against annular shoulder 13.

Figure 3:
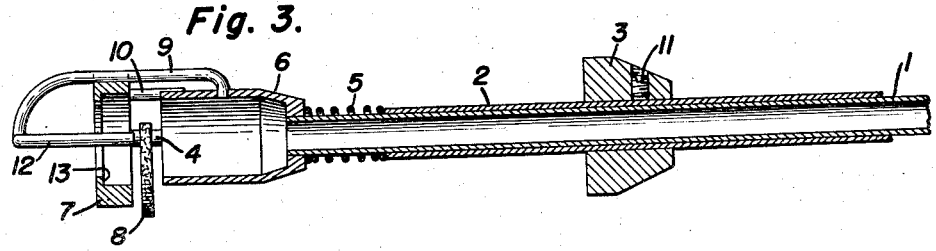
Fig. 3 is a sectional elevational view of the sampler showing the ejection of the filter disk.
Figure 4:
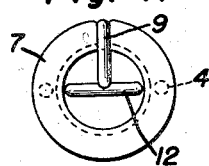
Fig. 4 is an end view of the sampler.
Figure 5:
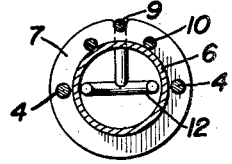
Fig. 5 is a sectional view of the sampler taken along line 5—5 of Fig. 1.
Figure 6:
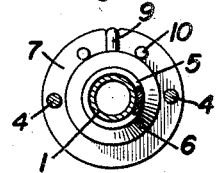
Fig. 6 is a sectional view of the sampler taken along line 6—6 of Fig. 1.

Operation of the sampler is as follows: The high speed sampler is held with the loading lugs 10 down, by gripping the end of the outer tube 2. The sampler is opened by pushing the end of the ejector 9 against a solid object thereby moving the filter head 6 away from filter holder 7. This compresses the spring 5 as in Fig. 3 and allows room for the filter disk to be dropped onto the loading lugs 10. Releasing the pressure allows the spring to extend forcing the filter disk against its seat 13 in the filter holder 7. Fig. 2 shows the filter disk 8 in position ready to sample. Vacuum is applied to the inner tube 1 by means of a rubber hose fitted over the handle end of the tube. The atmosphere to be sampled is thus drawn through the filter disk. To eject the filter disk the sampler is held with the loading lugs 10 up, as shown in Fig. 3. The ejector rod 9 is pressed against a solid object as in loading. A U-shaped rod can be attached to ejector rod 9 forming prongs 12 which pass through the filter holder and push the filter disk free. The filter disk is neatly caught in an awaiting container which is capped at once.

Having thus described what I believe to be the preferred embodiment of my invention it will be understood that various modifications may be resorted to within the scope of the appended claims.

I claim:

1. An atmospheric sampler comprising a filter disk; means to hold said disk; locking means to lock said disk in said holding means; said holding means comprising a ring, said ring including an internal annular shoulder facing said locking means, said shoulder acting as a seat for said filter disk; said locking means comprising a hollow member, a tube attached to said hollow member and adapted for connection to a suction source, said tube forming a conduit to the interior of said hollow member so that suction can be applied to said disk, a second tube telescopically surrounding said first tube, a movable block attached to said second tube, tie rods connecting said ring and said block, said tie rods maintaining said ring in fixed relationship to said block and thereby said second tube, a spring surrounding said first tube and bearing against said hollow member and said second tube thereby urging said hollow member towards said ring so as to lock said disk on said shoulder of said ring; and means to eject disk from said ring after applying suction to said disk.

2. An atmospheric sampler as defined in claim 1 in which said ring is so shaped as to provide a passage and in which said ejecting means comprises, a first rod attached at one end to said hollow member, said rod extending through said passage and being slidable therein, a U-shaped rod attached to the other end of said rod and lying in a plane passing through the longitudinal axis of said sampler, said U-shaped rod being so adapted as to move into said ring against said disk when said hollow member moves away from said ring against the force of said spring, thereby ejecting said disk from said ring.

3. An atmospheric sampler as defined in claim 1 in which said ring is so shaped as to provide a passage and in which said ejecting means comprises a rod attached to said hollow member at one end and having a free end, said rod extending through said passage and slidable therein and so adapted that on movement of said hollow member away from said ring against the force of said spring, said free end moves into said ring against said disk thereby ejecting said disk from said ring.

4. An atmospheric sampler as defined in claim 1 and further comprising means mounted on said ring to guide said hollow member against said disk thereby seating said disk on said shoulder of said ring.

5. An atmospheric sampler as defined in claim 4 in which said guide means comprises rods mounted on said ring, said rods projecting towards said hollow member and engaging the surface of said hollow member so as to guide said hollow member against said disk when said hollow member is forced by said spring towards said ring.

References Cited in the file of this patent
UNITED STATES PATENTS

| | | |
|---|---|---|
| 2,034,795 | Carkhuff | Mar. 24, 1936 |
| 2,307,318 | Kenney | Jan. 5, 1943 |
| 2,321,220 | Lieberman | June 8, 1943 |